(12) United States Patent
Lim et al.

(10) Patent No.: US 10,031,048 B2
(45) Date of Patent: Jul. 24, 2018

(54) METHOD FOR PERFORMING CONDITION MONITORING IN A WIND FARM

(75) Inventors: Khoon Peng Lim, Singapore (SG); Yu Zhou, Singapore (SG); Wanying Chen, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 1457 days.

(21) Appl. No.: 13/807,426

(22) PCT Filed: Jun. 27, 2011

(86) PCT No.: PCT/DK2011/050240
§ 371 (c)(1),
(2), (4) Date: Jun. 21, 2013

(87) PCT Pub. No.: WO2012/000506
PCT Pub. Date: Jan. 5, 2012

(65) Prior Publication Data
US 2013/0261988 A1    Oct. 3, 2013

Related U.S. Application Data

(60) Provisional application No. 61/359,175, filed on Jun. 28, 2010.

(30) Foreign Application Priority Data

Jun. 28, 2010 (DK) .................................. 201070295

(51) Int. Cl.
*B63H 3/00* (2006.01)
*G01M 15/14* (2006.01)
(Continued)

(52) U.S. Cl.
CPC ............. *G01M 15/14* (2013.01); *F03D 7/048* (2013.01); *F03D 17/00* (2016.05);
(Continued)

(58) Field of Classification Search
USPC ..................... 709/248; 702/39, 179; 384/448
See application file for complete search history.

(56) References Cited

U.S. PATENT DOCUMENTS 6,695,483 B2 * 2/2004 Sakatani ................. B61F 15/20
384/448
2009/0217101 A1    8/2009 Becker
(Continued)

FOREIGN PATENT DOCUMENTS

DE        10065314 A1    7/2002
EP         1612458 A2    1/2006
(Continued)

OTHER PUBLICATIONS

International Search Report, PCT/DK2011/050240, dated Mar. 7, 2012.

*Primary Examiner* — Lam Nguyen
(74) *Attorney, Agent, or Firm* — Patterson + Sheridan, LLP

(57) ABSTRACT

A method for performing condition monitoring on a plurality of wind turbines of a wind farm comprises for each wind turbine, obtaining at least one vibration signal representing vibrations of one or more monitored components; generating a plurality of faulty frequency indexes on the basis of one or more of the obtained vibration signals, and in such a manner that variations in rotational speed of one or more rotating shafts of the wind turbine are filtered; comparing faulty frequency indexes originating from different wind turbines; and determining the condition of each of the monitored components based on the comparison.

16 Claims, 3 Drawing Sheets

(51) Int. Cl.
*G05B 23/02* (2006.01)
*F03D 7/04* (2006.01)
*F03D 17/00* (2016.01)

(52) U.S. Cl.
CPC ..... *G05B 23/0237* (2013.01); *G05B 23/0283* (2013.01); *F05B 2240/96* (2013.01); *F05B 2260/80* (2013.01); *F05B 2270/327* (2013.01); *F05B 2270/334* (2013.01); *G05B 2219/2619* (2013.01); *Y02E 10/723* (2013.01)

(56) References Cited

U.S. PATENT DOCUMENTS

2010/0268849 A1* 10/2010 Bengtson ............... G05B 15/02
 709/248
2012/0130678 A1* 5/2012 Ishioka ................... F03D 17/00
 702/179

FOREIGN PATENT DOCUMENTS

| EP | 2072975 A1 | 6/2009 |
| EP | 2267305 A2 | 12/2010 |
| WO | 2010069318 A1 | 6/2010 |
| WO | 2010069318 A8 | 9/2010 |

* cited by examiner

METHOD FOR PERFORMING CONDITION MONITORING IN A WIND FARM

FIELD OF THE INVENTION

The present invention relates to a method for performing condition monitoring on a plurality of wind turbines arranged in a wind farm. More particularly, the present invention relates to a method in which various components, e.g. gears and bearings, of the wind turbines are monitored with the purpose of detecting components which are failing, faulty, malfunctioning and/or operating in a non-optimal manner.

The present invention further relates to a condition monitoring system for a wind turbine, to a wind turbine comprising a condition monitoring system, and to a wind farm.

BACKGROUND OF THE INVENTION

Vibration signals measured by means of sensors arranged at or near components of a wind turbine are very efficient for the purpose of monitoring the health condition of the wind turbine. Accordingly, vibration signals have been widely used for decades in machine condition monitoring and fault diagnostics. However, in wind turbine industry, wide variations of geographical location weather conditions exist. Furthermore, wind turbine systems are complex and require several vibration signals in order to monitor the health of a wind turbine. Accordingly, a vast amount of data is required in order to monitor the health of a wind turbine, and the required amount of data is even larger in the case that a large wind turbine population, such as a wind farm, is monitored. As a result, the usual technology of comparing the vibration signal to a reference value in order to establish if a monitored wind turbine component is normal or abnormal is not practical or efficient.

US 2005/0284225 A1 discloses a system and a method for monitoring the condition of a drive train of a wind turbine. The condition monitoring system comprises at lease one vibration sensor located on a gearbox casing. A processing unit is coupled to the vibration sensor and is configured to receive signals representative of the detected vibrations from the vibration sensor. The processing unit may be operable to process the signals representative of detected vibrations of gears and bearings and to compute at least one dynamic energy index or location of fault. Each normalized dynamic energy index corresponds to a defined frequency band, which in turn corresponds to a particular gear set or the bearings. The normalized dynamic energy index is compared to predetermined reference values to determine if a fault is present in either the gear sets or the bearings.

DESCRIPTION OF THE INVENTION

It is an object of embodiments of the invention to provide a method for performing condition monitoring on a plurality of wind turbines arranged in a wind farm, the method allowing faults or malfunction of one or more wind turbine components to be readily detected.

It is a further object of embodiments of the invention to provide a method for performing condition monitoring on a plurality of wind turbines arranged in a wind farm, the method allowing effective use of vibration signals.

It is an even further object of embodiments of the invention to provide a condition monitoring system for a wind turbine, the condition monitoring system being capable of readily detecting faults or malfunction of one or more wind turbine components.

According to a first aspect of the invention there is provided a method for performing condition monitoring on a plurality of wind turbines arranged in a wind farm, the method comprising the steps of:

for each wind turbine, obtaining at least one vibration signal, each vibration signal representing vibrations of one or more monitored components of the wind turbine, generating a plurality of faulty frequency indexes, each faulty frequency index corresponding to a monitored component, each faulty frequency index being generated on the basis of one or more of the obtained vibration signals, and each faulty frequency index being generated in such a manner that variations in the vibration signals introduced by variations in rotational speed of one or more rotating shafts of the wind turbine are filtered out, comparing faulty frequency indexes originating from different wind turbines of the wind farm, and based on the comparing step, evaluating the condition of each of the monitored components of the plurality of wind turbines.

In the present context the term 'condition monitoring of a wind turbine' should be interpreted to mean a process in which the health condition of the wind turbine and/or of one or more components of the wind turbine is monitored. For instance, it may be monitored whether or not a given wind turbine component is operating as it is supposed to, i.e. whether or not a given wind turbine component is failing, faulty, malfunctioning and/or operating in a non-optimal manner. Monitored wind turbine components may include, but is not limited to, drive train components, such as gears, or bearings.

In the present context the term 'wind farm' should be interpreted to cover two or more wind turbines arranged at a wind turbine site. Two or more wind turbines arranged in a wind farm are often operated in a combined manner, i.e. in dependence of each other.

According to the method of the invention, at least one vibration signal is initially obtained for each of the wind turbines of the wind farm. Each vibration signal represents vibrations of one or more monitored components of the wind turbine.

As described above, vibration signals contain a lot of useful information regarding the health condition of wind turbine components, and accordingly such signals are very suitable for condition monitoring purposes.

The vibration signals may be measured directly by means of sensor devices arranged at or near the relevant wind turbine components. Alternatively or additionally, one or more of the vibration signals may be derived from measurements of other relevant parameters.

A given vibration signal may represent vibrations of only a single monitored component, in which case the vibration signal may advantageously be obtained by means of a vibration sensor arranged directly on or in immediate vicinity of the component. As an alternative, a given vibration signal may represent vibrations of two or more different components, e.g. components being arranged immediately adjacent to each other, and/or being vibrationally coupled to each other.

Similarly, vibrations of a given monitored component may be represented by only a single vibration signal. Alternatively, vibrations of a given monitored component may be represented by a combination of two or more different vibration signals.

Next, a plurality of faulty frequency indexes are generated. Each faulty frequency index corresponds to a monitored component, i.e. a faulty frequency index is generated for each of the monitored components.

Each faulty frequency index is generated on the basis of one or more of the obtained vibration signals, preferably on the basis of the vibration signal(s) which represent(s) the monitored component in question.

Each faulty frequency index is generated in such a manner that variations in the vibration signals introduced by variations in rotational speed of one or more rotating shafts of the wind turbine are filtered out. Variations in rotational speed of a rotating shaft of a wind turbine may, e.g., be caused by variations in wind conditions, e.g. the wind speed, and such variations are, of course, independent of the health condition of the wind turbine. Furthermore, variations in rotational speed of a rotating shaft of a wind turbine will typically be directly reflected in the vibration levels which can be measured in the wind turbine. However, since such variations in the vibration levels have nothing to do with the health condition of the wind turbine, it is an advantage to filter them out when generating the faulty frequency indexes.

In summary, each of the generated faulty frequency indexes provides a good indication of the health condition of a given component of a given wind turbine of the wind farm, since it represents the vibration level of said component, without the contribution introduced by variations in rotational speed of one or more rotating shafts of the wind turbine.

Next, the faulty frequency indexes originating from different wind turbines of the wind farm are compared, and the condition of each of the monitored components of the plurality of wind turbines is evaluated, based on the comparison. Since the comparison takes place at wind farm level, i.e. faulty frequency indexes originating from different wind turbines are compared, a vast amount of data is available, thereby making the evaluation very precise and efficient. Furthermore, this makes it very easy to detect a wind turbine which behaves differently from the other wind turbines of the wind farm. This is an advantage because this may very well be an indication that this wind turbine, or one or more components of this wind turbine, is failing or operating in a non-optimal manner.

The step of generating a plurality of faulty frequency indexes may comprise calculating a ratio between a frequency of an obtained vibration signal and a frequency of a rotational speed signal of a rotating shaft. In the case that variations in the wind conditions, such as the wind speed, occur, the influence on the frequency of a vibration signal can be expected to by substantially identical to the influence on the frequency of a rotational speed signal of a rotating shaft. Therefore, the ratio between such two signals must be expected to represent the vibration level without the contribution introduced by variations in wind conditions, or other ambient conditions, which result in variations in the rotational speed of a rotating shaft of the wind turbine.

For instance, the faulty frequency indexes may be calculated using a formula of the form:

$$Index_{F_i} = \frac{f_{F_i}(f_{rpm} p_1 \cdots p_n)}{f_{rpm}},$$

wherein $F_i$ refers to the various faulty frequencies of the components, $f_{rpm}$ refers to a rotating speed of a rotating shaft of the wind turbine, $p_1$ to $p_n$ refers to design parameters of the components, and $f_{F_i}(\cdot)$ refers to the formula used for calculating the various component faulty frequencies. The faulty frequencies, $F_i$, could e.g. be faulty frequencies of Ball Pass Frequency Outer Race (BPFO), Ball Pass Frequency Inner Race (BPFI), Ball Spin Frequency (BSF), Fundamental Train Frequency (FTF), Gear Mesh Frequency (GMF), etc. As an example, the faulty frequency index corresponding to BPFO may be calculated as:

$$Index_{BPFO} = \frac{F_{BPFO}}{F_{HighSpeedShaft}} = \frac{n}{2}\left(1 + \frac{B_d}{P_d}\cos\theta\right),$$

wherein n is the number of rolling elements, $B_d$ is the ball diameter, $P_d$ is the pitch diameter of the bearing, and $\theta$ is the contact angle.

The rotational speed signal may be the rotational speed of a high speed shaft. The high speed shaft may, e.g., be a shaft interconnecting a gear system and a generator. In this case the rotational speed may be measured directly. As an alternative, it may be calculated from a measured value of the power produced by the wind turbine.

As an alternative, the rotational speed signal may be the rotational speed of a low speed shaft, such as a main shaft of the wind turbine interconnecting the rotor and a gear system.

The rotational speed signal may be calculated from one or more values measured in or near one or more of the wind turbines. According to this embodiment, the rotational speed signal is not measured directly.

At least one of the measured values may be a power produced by one of the wind turbines. In this case the measured power may advantageously be the power produced by the generator of the wind turbine. The rotational speed of the high speed shaft interconnecting the gear train and the generator is directly related to the produced power, and accordingly, the rotational speed of the high speed shaft can easily be calculated from the produced power. Furthermore, the produced power is a very reliable parameter, which is normally monitored anyway, e.g. for the purpose of operating the wind turbine.

As an alternative, the rotational speed may be calculated from other measured values. For instance, a rotational speed of a high speed shaft may be calculated from a measured value of a rotational speed of a low speed shaft, such as a main shaft interconnecting the rotor and the gear system, knowing the gear ratio of the gear system. Similarly, the rotational speed of a low speed shaft may be calculated from a measured value of the rotational speed of a high speed shaft.

The step of comparing faulty frequency indexes may comprise comparing vibration levels associated with faulty frequency indexes corresponding to substantially identical monitored components from at least two different wind turbines of the wind farm. According to this embodiment, a faulty frequency index corresponding to a given component of one wind turbine of the wind farm is compared to faulty frequency indexes corresponding to identical, or at least similar, components of one or more other wind turbines of the wind farm. For instance, faulty frequency indexes corresponding to Ball Pass Frequency Outer Race (BPFO) may be compared between the wind turbines at farm level. Thereby it can easily be detected if a faulty frequency index originating from one of the turbines deviates significantly from the similar faulty frequency indexes of the other wind turbines of the wind farm, thereby indicating that this wind turbine is faulty or failing, as well as pinpointing which component of the wind turbine is faulty or failing.

The method may further comprise the step of comparing one or more faulty frequency indexes to historical values of said faulty frequency index. According to this embodiment, it is possible to detect if a component of a given wind turbine of the wind farm is drifting, since if this is the case, the corresponding faulty frequency index will change, thereby deviating from the historical mean of the faulty frequency index. The historical mean value may advantageously be obtained during operating conditions where it is known that the corresponding component is in good operating condition.

Thus, the step of evaluating the condition of each of the monitored components may, in this case, further be based on the step of comparing one or more faulty frequency indexes to historical values of said faulty frequency index, and the step of evaluating the condition of each of the monitored components may comprise determining that a given component is faulty if its vibration level at a faulty frequency index corresponding to said component deviates significantly from a historical mean vibration level at said faulty frequency index.

The method may further comprise the steps of grouping the generated faulty frequency indexes according to turbine and/or according to monitored component and/or according to power class of the operating wind turbines, and displaying the grouped faulty frequency indexes. Such grouping and displaying of the generated faulty frequency indexes makes it very easy to compare the faulty frequency indexes on farm level, and to detect any deviations which may indicate that a wind turbine, or a component of a wind turbine, is faulty or failing.

In the present context the term 'power class' should be interpreted to mean an output power interval for the wind turbine. For a specific wind turbine with a given nominal output power, the power levels are divided into suitable intervals, and the highest power class corresponds to nominal power or almost nominal power.

The step of evaluating the condition of each of the monitored components may comprise determining that a given component is faulty if its vibration level at a faulty frequency index corresponding to said component deviates significantly from vibration levels at faulty frequency indexes corresponding to substantially identical components from two or more other wind turbines. Since the wind turbines are arranged in a wind farm they are expected to experience similar ambient conditions, such as wind conditions, temperature, rain, snow, ice formation, etc. Therefore the vibration levels are expected to be comparable from one wind turbine to another. Consequently, if a vibration level of a wind turbine deviates significantly from corresponding vibration levels of the other wind turbines, the deviating wind turbine is likely to be faulty.

According to a second aspect the invention provides a condition monitoring system for a wind turbine, the condition monitoring system being arranged to perform the method steps of the method according to the first aspect of the invention. Thus, the condition monitoring system of the second aspect of the invention is capable of detecting faults or failures in wind turbine components in an easy and reliable manner.

According to a third aspect the invention provides a wind turbine comprising a condition monitoring system according to the second aspect of the invention.

According to a fourth aspect the invention provides a wind farm comprising a plurality of wind turbines, at least one of the wind turbines being a wind turbine according to the third aspect of the invention.

BRIEF DESCRIPTION OF THE DRAWINGS

The invention will now be described in further detail with reference to the accompanying drawings in which.

DETAILED DESCRIPTION OF THE DRAWINGS

Figure 1:
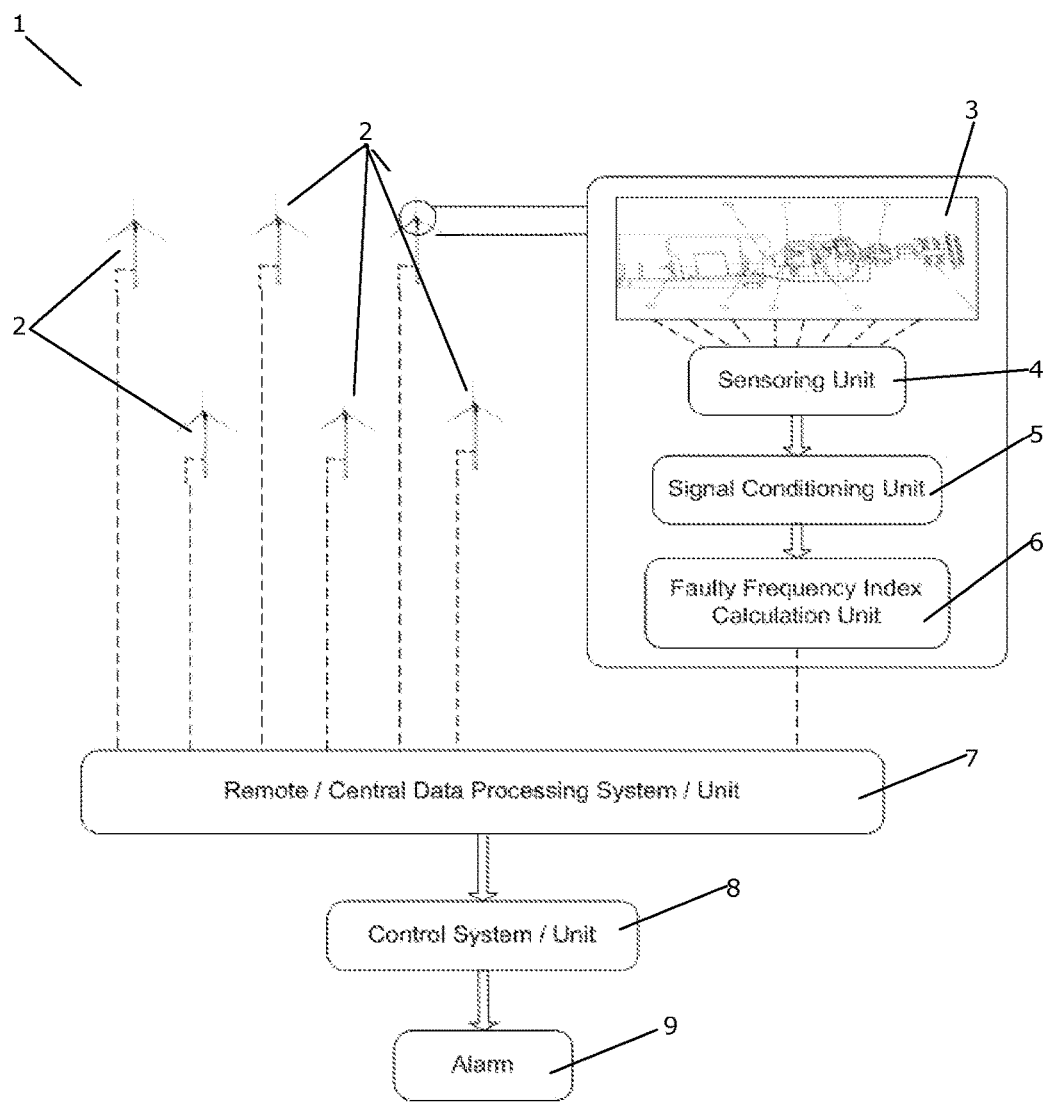
FIG. 1 is a schematic drawing of a wind farm in which condition monitoring is performed in accordance with a method according to an embodiment of the invention.

FIG. 1 is a schematic drawing of a wind farm 1 comprising a plurality of wind turbines 2, six of which are shown. Each wind turbine 2 is equipped with a number of sensor devices arranged at various positions along the drive train, as illustrated in box 3. The sensor devices are preferably arranged at or near components of the wind turbine 2 which it is desired to monitor, such as moving gear parts and bearings.

For each of the wind turbines, the sensor devices communicate measured signals to a sensing unit 4, i.e. the sensing unit 4 of a given wind turbine 2 collects data obtained by the sensor devices of that wind turbine 2. The sensing unit 4 supplies the received data to a signal conditioning unit 5. In the signal conditioning unit 5 the data is processed, and the processed signal is forwarded to a faulty frequency index calculation unit 6, where appropriate faulty frequency indexes are calculated on the basis of the processed data received from the signal conditioning unit 5.

The calculated faulty frequency indexes from each of the wind turbines 2 are forwarded to a central data processing unit 7. The central data processing unit 7 is located remotely with respect to the individual wind turbine 2 and centrally with respect to the wind farm 1. Accordingly, the central data processing unit 7 receives calculated faulty frequency indexes from each of the wind turbines 2 of the wind farm 1 with the purpose of processing the faulty frequency indexes, including comparing them on farm level. The central data processing unit 7 may, e.g., group the faulty frequency indexes according to turbine 2 and/or according to monitored component and/or according to power class of the operating wind turbines 2, and present these grouped data in a manner which allows any deviations to be easily and reliably detected.

The central data processing unit 7 forwards the processed faulty frequency indexes to a control system 8. Based on the received processed faulty frequency indexes the control system 8 is capable of determining whether or not the monitored components of the wind turbines 2 are operating as they are supposed to. In the case that it is determined that a given component is faulty or failing, the control system 8 generates an alarm 9. The alarm 9 notifies maintenance personnel that a component is faulty or failing, as well as providing information regarding which component of which wind turbine 2 is faulty or failing. Maintenance can thereby be scheduled in order to repair or replace the faulty or failing component. If appropriate, the control system 8 may further adjust operation of the wind turbine 2 in response to the detection of a faulty or failing component. In some cases it may be necessary to stop operation of the wind turbine 2. In other cases it may be necessary to operate the wind turbine 2 at an output power level which is lower than the maximum possible output power level under the given wind conditions in order to allow the wind turbine 2 to continue operating until maintenance is performed.

Figure 2:
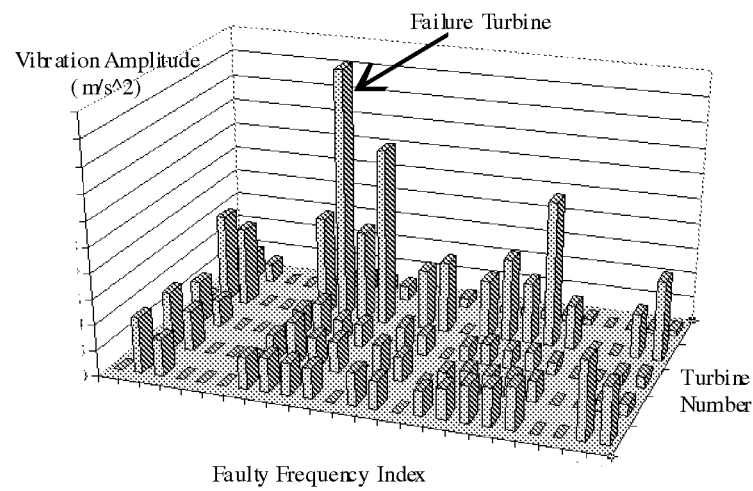
FIG. 2 is a plot of vibration amplitudes, grouped according to faulty frequency index and turbine number.

FIG. 2 is a plot of vibration amplitudes. Each bar in the plot represents a faulty frequency index, and the vibration amplitudes are grouped according to faulty frequency index and turbine number. Thereby it is very easy to detect any deviations. For instance, the vibration level marked as 'Failure turbine' is significantly higher than the vibration levels of corresponding faulty frequency indexes of the other wind turbines. This indicates that the wind turbine component which is associated with the high vibration level is faulty or failing. Furthermore, it is clear from the plot of FIG. 2 that several vibration levels corresponding to that wind turbine are higher than the vibration levels of corresponding faulty frequency indexes of the other wind turbines, thereby providing further indication that the wind turbine, or at least a component of the wind turbine, is faulty.

The processed data which is provided by the central data processing unit 7 to the control system 8 illustrated in FIG. 1 may, e.g., include a plot similar to the plot of FIG. 2.

Figure 3:
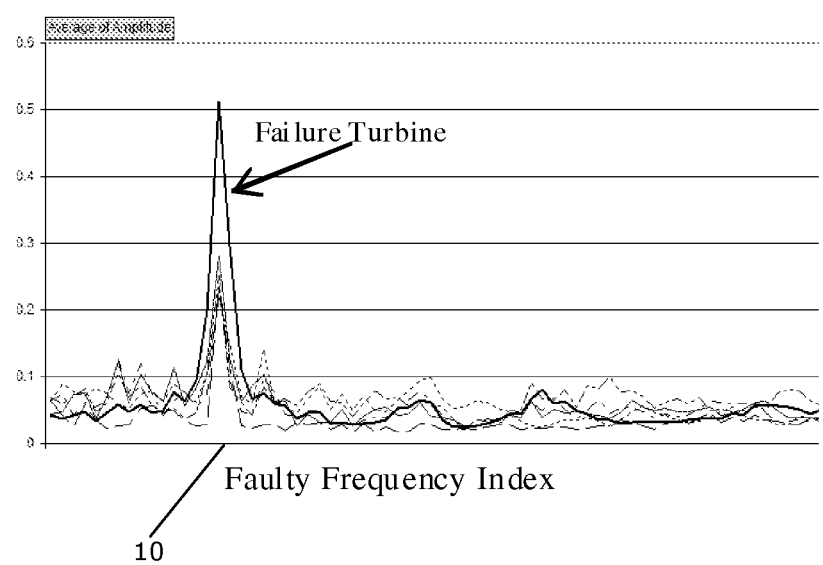
FIG. 3 is a graph of vibration amplitude as a function of faulty frequency index for a number of wind turbines arranged in a wind farm.

FIG. 3 is a graph of vibration amplitude as a function of faulty frequency index for a number of wind turbines arranged in a wind farm. For all of the wind turbines, the vibration amplitude corresponding to the faulty frequency 10 is significantly higher than the vibration amplitudes for the other frequency indexes. However, this is not considered alarming in itself, because most of the vibration amplitudes are at substantially the same level. One exception to this is the vibration amplitude marked as 'Failure Turbine'. This vibration amplitude is significantly higher than the other vibration amplitudes corresponding to this faulty frequency index, thereby indicating that the corresponding wind turbine component is faulty or failing.

The processed data which is provided by the central data processing unit 7 to the control system 8 illustrated in FIG. 1 may, e.g., include a graph similar to the graph of FIG. 3.

Figure 4:
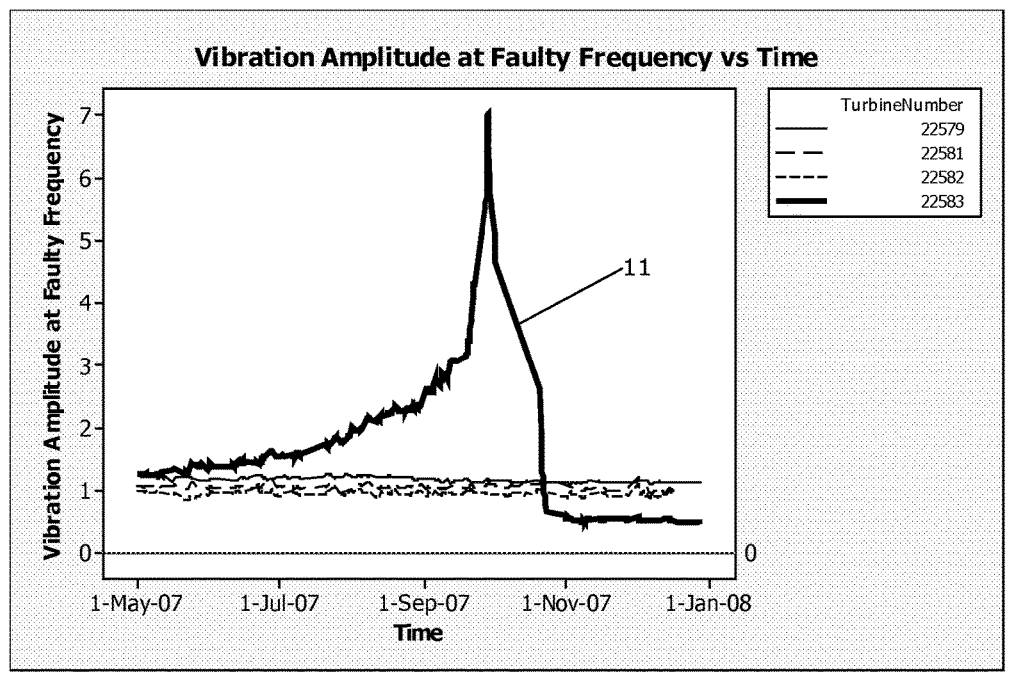
FIG. 4 is a graph of vibration amplitude as a function of time for four wind turbines arranged in a wind farm.

FIG. 4 is a graph of vibration amplitude as a function of time for four wind turbines arranged in a wind farm. The illustrated vibration amplitudes correspond to faulty frequency indexes associated with identical or similar wind turbine components of the four wind turbines. It is clear from FIG. 4 that for three of the wind turbines the vibration level remains at a substantially constant level during a period from May 2007 to January 2008. However, for wind turbine number 22583, illustrated by line 11, the vibration amplitude gradually increases, starting in June 2007. From approximately September 2007 to October 2007 the increase in vibration amplitude is dramatic, and in October 2007 the wind turbine component breaks down, illustrated by a dramatic decrease in the illustrated vibration amplitude.

The development illustrated in FIG. 4 is detected using a prior art condition monitoring method. However, had a condition monitoring method according to the present invention been used, the gradual increase in vibration amplitude of the faulty wind turbine could have been detected in due course, and the break down of the wind turbine component could have been avoided. This could be achieved either by comparing the vibration amplitudes originating from the various wind turbines, or by comparing the vibration amplitude of a given wind turbine to historical values of the vibration amplitude of said wind turbine.

The invention claimed is:

1. A method for performing condition monitoring of a plurality of monitored components of a plurality of wind turbines arranged in a wind farm, the method comprising:
   for each of the plurality of wind turbines, obtaining at least one vibration signal, each vibration signal representing vibrations of a respective monitored component of the plurality of monitored components,
   generating a plurality of faulty frequency indexes corresponding to at least a first faulty frequency having a predefined association with each of the plurality of monitored components, each faulty frequency index corresponding to a respective one of the plurality of monitored components, each faulty frequency index being generated on the basis of one or more of the obtained vibration signals, and each faulty frequency index being generated in such a manner that variations in the vibration signals introduced by variations in rotational speed of one or more rotating shafts of the wind turbine are filtered out,
   comparing faulty frequency indexes originating from different wind turbines of the wind farm, and
   based on comparing the faulty frequency indexes determining the condition of each of the monitored components of the plurality of wind turbines.

2. A method according to claim 1, wherein generating a plurality of faulty frequency indexes comprises calculating a ratio between a frequency of an obtained vibration signal and a frequency of a rotational speed signal of a rotating shaft.

3. A method according to claim 2, wherein the rotational speed signal is the rotational speed of a high speed shaft.

4. A method according to claim 1, wherein the rotational speed signal is calculated from one or more values measured in or near one or more of the wind turbines.

5. A method according to claim 4, wherein at least one of the measured values is a power produced by one of the wind turbines.

6. A method according to claim 1, wherein comparing faulty frequency indexes comprises comparing vibration levels associated with faulty frequency indexes corresponding to substantially identical monitored components from at least two different wind turbines of the wind farm.

7. A method according to claim 1, further comprising comparing one or more faulty frequency indexes to historical values of said faulty frequency index.

8. A method according to claim 7, wherein evaluating the condition of each of the monitored components is further based on comparing one or more faulty frequency indexes to historical values of said faulty frequency index.

9. A method according to claim 8, wherein evaluating the condition of each of the monitored components comprises determining that a given component is faulty if its vibration level at a faulty frequency index corresponding to said component deviates significantly from a historical mean vibration level at said faulty frequency index.

10. A method according to claim 1, further comprising grouping the generated faulty frequency indexes according to turbine and/or according to monitored component and/or according to power class of the operating wind turbines, and displaying the grouped faulty frequency indexes.

11. A method according to claim 1, wherein evaluating the condition of each of the monitored components comprises determining that a given component is faulty if its vibration level at a faulty frequency index corresponding to said component deviates significantly from vibration levels at faulty frequency indexes corresponding to substantially identical components from two or more other wind turbines.

12. A condition monitoring system for a wind turbine, the condition monitoring system communicatively coupled to a plurality of wind turbines in a wind farm, the condition monitoring system is configured to:

for each wind turbine of the plurality of wind turbines, obtain at least one vibration signal, each vibration signal representing vibrations of a respective monitored component in the wind turbine;

generate a plurality of faulty frequency indexes corresponding to at least a first faulty frequency having a predefined associated with each of a plurality of monitored components, each faulty frequency index corresponding to a respective one of the plurality of monitored components, each faulty frequency index being generated on the basis of one or more of the obtained vibration signals, and each faulty frequency index being generated in such a manner that variations in the vibration signals introduced by variations in rotational speed of one or more rotating shafts of the wind turbine are filtered out;

compare faulty frequency indexes originating from different wind turbines of the wind farm; and based on comparing the faulty frequency indexes, determine the condition of each of the monitored components of the plurality of wind turbines.

13. The condition monitoring system of claim 12, wherein generating a plurality of faulty frequency indexes comprises calculating a ratio between a frequency of an obtained vibration signal and a frequency of a rotational speed signal of a rotating shaft.

14. The condition monitoring system of claim 13, wherein the rotational speed signal is the rotational speed of a high speed shaft.

15. The condition monitoring system of claim 12, wherein the rotational speed signal is calculated from one or more values measured in or near one or more of the plurality of wind turbines.

16. The condition monitoring system of claim 15, wherein at least one of the measured values is a power produced by one of the plurality of wind turbines.

* * * * *